(12) United States Patent
Xu et al.

(10) Patent No.: US 10,731,469 B2
(45) Date of Patent: Aug. 4, 2020

(54) METHOD AND APPARATUS TO ENHANCE LAMINAR FLOW FOR GAS TURBINE ENGINE COMPONENTS

(71) Applicant: UNITED TECHNOLOGIES CORPORATION, Farmington, CT (US)

(72) Inventors: JinQuan Xu, East Greenwich, RI (US); James Tilsley Auxier, Bloomfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 15/696,307

(22) Filed: Sep. 6, 2017

(65) Prior Publication Data

US 2017/0370228 A1    Dec. 28, 2017

Related U.S. Application Data

(63) Continuation-in-part of application No. 15/155,146, filed on May 16, 2016.

(51) Int. Cl.
*F01D 5/14* (2006.01)
*F01D 5/18* (2006.01)
(Continued)

(52) U.S. Cl.
CPC ............... *F01D 5/145* (2013.01); *F01D 5/14* (2013.01); *F01D 5/141* (2013.01); *F01D 5/147* (2013.01);
(Continued)

(58) Field of Classification Search
CPC . F01D 5/147; F01D 5/14; F01D 5/141; F01D 5/145; F01D 5/18; F01D 5/186;
(Continued)

(56) References Cited

U.S. PATENT DOCUMENTS 1,829,674 A * 10/1931 Otto .................. F01D 25/32
    415/115
2,489,683 A * 11/1949 Stalker .................. F01D 5/08
    415/115

(Continued)

FOREIGN PATENT DOCUMENTS

WO    2015/094498    6/2015

*Primary Examiner* — Kenneth J Hansen
*Assistant Examiner* — Eric J Zamora Alvarez
(74) *Attorney, Agent, or Firm* — Carlson, Gaskey & Olds, P.C.

(57) ABSTRACT

A gas turbine engine component has a component body configured to be positioned within a flow path of a gas turbine engine having an external pressure, and wherein the component body includes at least one internal cavity having an internal pressure. At least one inlet opening is formed in an outer surface of the component body to direct hot exhaust gas flow into the at least one internal cavity, and there is at least one outlet from the internal cavity. The internal pressure is less than an inlet external pressure at the inlet opening and the internal pressure is greater than an outlet external pressure at the outlet opening to controllably ingest hot exhaust gas via the inlet opening and expel the hot exhaust gas via the outlet opening to maintain a laminar boundary layer along the outer surface of the component body.

21 Claims, 4 Drawing Sheets

(51) Int. Cl.
  *F01D 9/04* (2006.01)
  *F02C 3/04* (2006.01)
  *F01D 5/28* (2006.01)
  *F01D 9/02* (2006.01)

(52) U.S. Cl.
  CPC ............... *F01D 5/18* (2013.01); *F01D 5/186* (2013.01); *F01D 5/288* (2013.01); *F01D 9/041* (2013.01); *F02C 3/04* (2013.01); *F01D 9/023* (2013.01); *F05D 2220/323* (2013.01); *F05D 2240/12* (2013.01); *F05D 2240/14* (2013.01); *F05D 2240/30* (2013.01); *F05D 2240/35* (2013.01); *F05D 2240/80* (2013.01); *F05D 2260/231* (2013.01); *F05D 2270/17* (2013.01); *F05D 2300/6033* (2013.01); *F05D 2300/611* (2013.01); *Y02T 50/672* (2013.01); *Y02T 50/673* (2013.01); *Y02T 50/676* (2013.01); *Y02T 50/6765* (2018.05)

(58) Field of Classification Search
  CPC . F01D 9/023; F01D 9/041; F02C 3/04; F04D 29/324; F04D 29/542; F04D 29/68; F04D 29/684; F23R 3/002; F23R 3/04; F05D 2220/32; F05D 2240/35; F05D 2240/80
  USPC .......................................... 415/115, 116, 914
  See application file for complete search history.

(56) References Cited

U.S. PATENT DOCUMENTS

| | | | |
|---|---|---|---|
| 2,501,614 A * | 3/1950 | Price | F01D 5/18 |
| | | | 415/115 |
| 2,870,957 A * | 1/1959 | Stalker | F04D 27/0215 |
| | | | 415/120 |
| 4,025,226 A | 5/1977 | Hovan | |
| 4,402,992 A * | 9/1983 | Liebert | C23C 4/134 |
| | | | 427/243 |
| 4,676,719 A | 6/1987 | Auxier et al. | |
| 5,327,727 A | 7/1994 | Ward | |
| 5,337,568 A | 8/1994 | Lee et al. | |
| 5,876,182 A | 3/1999 | Schulte | |
| 6,435,815 B2 | 8/2002 | Harvey et al. | |
| 6,451,416 B1 * | 9/2002 | Holowczak | B32B 18/00 |
| | | | 264/125 |
| 7,150,427 B1 | 12/2006 | Praisner | |
| 7,251,592 B1 | 7/2007 | Praisner et al. | |
| 7,484,937 B2 | 2/2009 | Johann | |
| 7,581,928 B1 | 9/2009 | Cunha | |
| 7,712,316 B2 | 5/2010 | Spangler | |
| 7,758,296 B2 * | 7/2010 | Borchers | F01D 5/148 |
| | | | 415/1 |
| 7,878,759 B2 | 2/2011 | Mills et al. | |
| 8,105,030 B2 | 1/2012 | Abbdel-Messeh et al. | |
| 8,133,008 B2 * | 3/2012 | Tsuchiya | F01D 5/145 |
| | | | 415/115 |
| 9,115,590 B2 | 8/2015 | Spangler et al. | |
| 2007/0128035 A1 * | 6/2007 | Ahmad | F01D 5/147 |
| | | | 416/97 R |
| 2010/0129231 A1 * | 5/2010 | Brittingham | F01D 5/186 |
| | | | 416/97 R |
| 2011/0052373 A1 | 3/2011 | Sparks | |
| 2013/0004309 A1 * | 1/2013 | Sambasivan | C04B 35/195 |
| | | | 415/208.1 |
| 2014/0363305 A1 * | 12/2014 | Shah | B22D 19/16 |
| | | | 416/241 R |
| 2015/0004000 A1 * | 1/2015 | Freeman | B23P 15/04 |
| | | | 416/97 R |
| 2016/0024936 A1 | 1/2016 | Corcoran | |
| 2016/0273391 A1 | 9/2016 | Burd et al. | |
| 2017/0152749 A1 | 6/2017 | Bunker et al. | |

\* cited by examiner

METHOD AND APPARATUS TO ENHANCE LAMINAR FLOW FOR GAS TURBINE ENGINE COMPONENTS

RELATED APPLICATION

This application is a continuation-in-part of U.S. application Ser. No. 15/155,146, filed May 16, 2016.

BACKGROUND OF THE INVENTION

Gas turbine engines are continually being driven to provide higher thrust efficiencies to maximize performance. As hot engine gases flow around airfoils in the turbine section, turbulent flow can be generated along an external surface of the airfoils, which adversely affects efficiencies. One proven method to improve efficiency includes optimizing airfoil/endwall shapes and minimizing turbine cooling air usage to reduce friction and pressure drag around the airfoil.

Airfoil friction drag is created by a combination of friction loss and mixing loss. Friction loss from near-wall turbulence that impacts a boundary layer along the external surface of the airfoil can result in a significant energy loss. In a cooled airfoil configuration, film cooling air may be targeted towards different areas or via different shaped holes to lessen the impact on friction and mixing loss factors. In an uncooled airfoil configuration, such features are not available making it difficult to improve efficiency.

SUMMARY OF THE INVENTION

In a featured embodiment, a gas turbine engine component has a component body configured to be positioned within a flow path of a gas turbine engine having an external pressure, wherein the component body includes at least one internal cavity having an internal pressure. At least one inlet opening is formed in an outer surface of the component body to direct hot exhaust gas flow into the at least one internal cavity. At least one outlet from the internal cavity, wherein the internal pressure is less than an inlet external pressure at the inlet opening and the internal pressure is greater than an outlet external pressure at the outlet opening to controllably ingest hot exhaust gas via the inlet opening and expel the hot exhaust gas via the outlet opening to maintain a laminar boundary layer along the outer surface of the component body.

In another embodiment according to the previous embodiment, the component body comprises at least one of an airfoil in a turbine or compressor, a platform, or a transition duct.

In another embodiment according to any of the previous embodiments, the component body comprises an airfoil having a leading edge, a trailing edge, and pressure and suction side walls extending from the leading edge to the trailing edge, and wherein the airfoil extends from a base to a tip.

In another embodiment according to any of the previous embodiments, at least one inlet opening comprises a plurality of inlet openings formed in one or both of the pressure and suction side walls.

In another embodiment according to any of the previous embodiments, the leading edge is free from inlet openings.

In another embodiment according to any of the previous embodiments, at least one outlet comprises at least one opening to the external surface that is located near or at the trailing edge.

In another embodiment according to any of the previous embodiments, at least one outlet comprises at least one opening to the external surface that is located near or at the tip.

In another embodiment according to any of the previous embodiments, the component body is a non-cooled component and the internal cavity is free from receiving cooling flow.

In another embodiment according to any of the previous embodiments, at least one inlet opening provides a passage surface that is coated with at least one of a thermal barrier coating or environmental barrier coating.

In another embodiment according to any of the previous embodiments, the internal cavity is coated with at least one of a thermal barrier coating or environmental barrier coating.

In another embodiment according to any of the previous embodiments, the internal cavity and the at least one inlet opening are coated with a plurality of coatings including at least one thermal barrier coating and at least one environmental barrier coating.

In another embodiment according to any of the previous embodiments, the component body is comprised of a non-metallic material.

In another embodiment according to any of the previous embodiments, the non-metallic material is a ceramic matrix composite (CMC) material.

In another featured embodiment, a gas turbine engine has a component body configured to be positioned within a flow path of a gas turbine engine having an external pressure, wherein the component body includes at least one internal cavity having an internal pressure. A plurality of inlet openings formed in an external surface of the component body to direct hot exhaust gas flow into the at least one internal cavity, wherein the inlet openings include a passage surface that is coated with at least one of a thermal barrier coating or environmental barrier coating. At least one outlet from the internal cavity, wherein the internal pressure is less than an inlet external pressure at the inlet opening and the internal pressure is greater than an outlet external pressure at the outlet opening to controllably ingest hot exhaust gas via the inlet opening and expel the hot exhaust gas via the outlet opening to maintain a laminar boundary layer along the outer surface of the component body.

In another embodiment according to the previous embodiment, the component body comprises an airfoil having a leading edge, a trailing edge, and pressure and suction side walls extending from the leading edge to the trailing edge, and wherein the airfoil includes the at least one internal cavity which is free from receiving cooling air flow, and wherein the plurality of inlet openings are formed within at least one of the pressure and second sides, and wherein the leading edge comprises a showerhead region that is free from holes or slots, and wherein the at least one outlet comprises at least one opening to the external surface that is located near or at the trailing edge.

In another embodiment according to any of the previous embodiments, a compressor section is included. A combustor section is downstream of the compressor section. A turbine section is downstream of the combustor section, and includes at least a high pressure turbine downstream of the combustor section and a low pressure turbine downstream of the high pressure turbine, and wherein the airfoil is located within the low pressure turbine.

In another embodiment according to any of the previous embodiments, the internal cavity is coated with at least one of a thermal barrier coating or environmental barrier coating.

In another embodiment according to any of the previous embodiments, the internal cavity and the at least one inlet opening are coated with a plurality of coatings including at least one layer of a thermal barrier coating and at least one layer of an environmental barrier coating.

In another embodiment according to any of the previous embodiments, the component is made of a non-metallic material comprising a CMC material.

In another featured embodiment, a method of enhancing laminar flow for a gas turbine engine component includes the a step of positioning a component body within a hot gas flow of a gas turbine engine having an external pressure. The component body includes at least one internal cavity having an internal pressure. At least one inlet opening is provided in an external surface of the component body to direct hot exhaust gas flow into the at least one internal cavity. The method also includes the step of providing at least one outlet from the internal cavity to external atmosphere. The internal pressure is maintained to be less than the external pressure at the inlet opening and to be greater than the external pressure at the outlet opening to controllably ingest a portion of the hot gas flow via the inlet opening and expel ingested hot exhaust gas via the outlet opening to maintain a laminar boundary layer of a remaining portion of the hot gas flow along the outer surface of the component body.

In another embodiment according to the previous embodiments, the component body comprises one of an airfoil, a platform or a transition duct in at least one of a mid-turbine frame or turbine exhaust case and including keeping the internal cavity free from cooling flow.

In another embodiment according to any of the previous embodiments, the component body is formed from a non-metallic material. At least one of the internal cavity and the at least one inlet opening are coated with at least one of a thermal barrier coating or environmental barrier coating.

The foregoing features and elements may be combined in any combination without exclusivity, unless expressly indicated otherwise.

These and other features may be best understood from the following drawings and specification.

DETAILED DESCRIPTION

Figure 1:
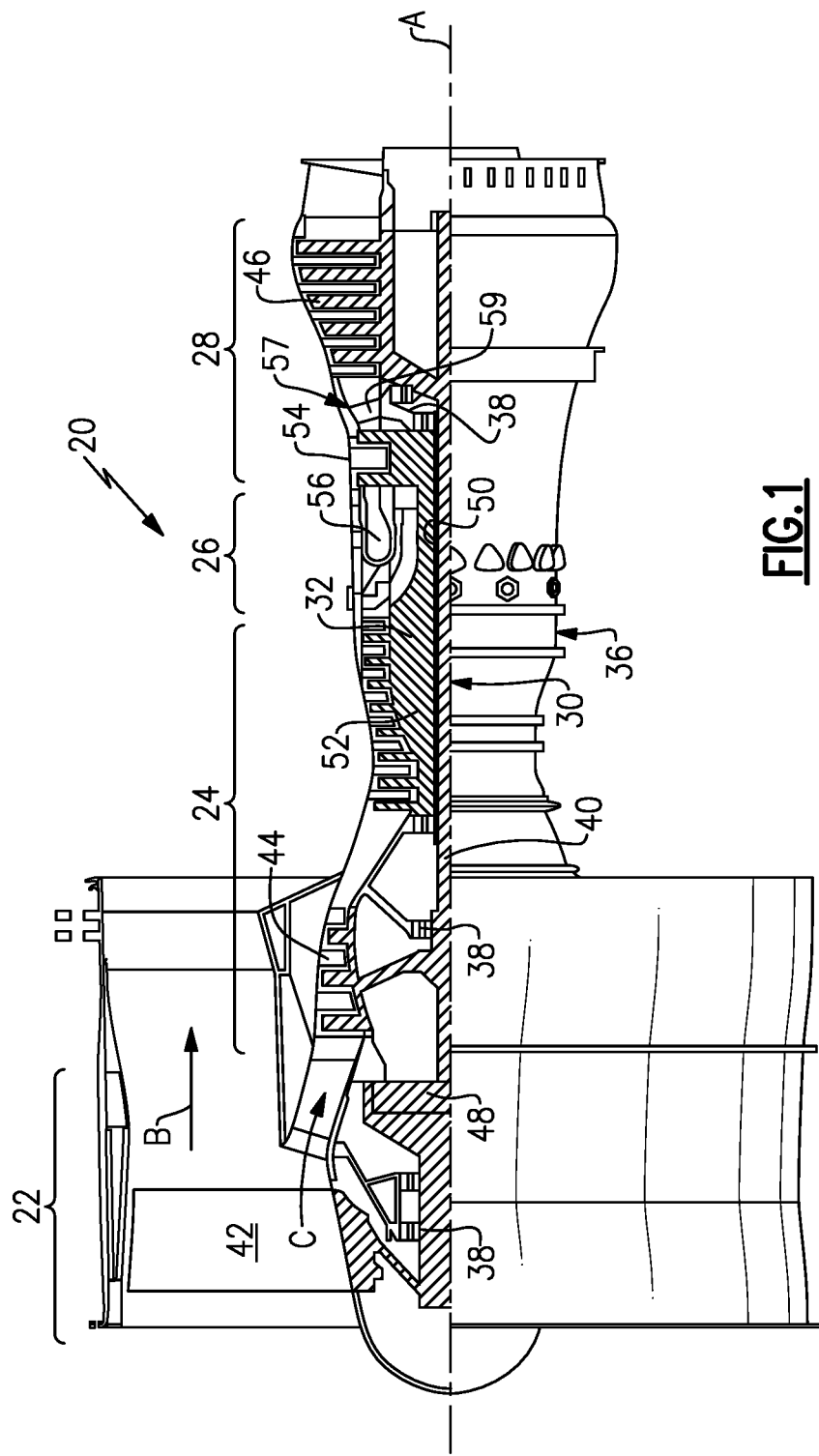
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \,°\, R)/(518.7°\, R)]^{0.5}$. The "Low corrected fan tip speed" as disclosed herein according to one non-limiting embodiment is less than about 1150 ft/second.

Airfoils located downstream of combustor section 26, such as stator vanes and rotor blades in the turbine section 28, for example, operate in a high-temperature environment. The airfoils located in the high pressure turbine 54 are subjected to higher temperatures than airfoils located in the low pressure turbine 46. Airfoils that are exposed to high temperatures, such as those in the high pressure turbine 54, typically include cooling circuits with internal cooling channels and film cooling channels that direct a flow of cooling air through the airfoil to remove heat, reduce friction and mixing loss factors, and thus prolong the useful life of the airfoil. Airfoils in the low pressure turbine are not actively cooled in this manner as they are not subjected to temperatures as high as those experienced by airfoils in the high pressure turbine 54.

By configuring these non-cooled low pressure turbine airfoils in the manner described below, efficiency can be improved and friction and mixing loss factors can be reduced. This efficiency increase is a direct result of configuring these airfoils such that a laminar boundary layer can be maintained as hot combustion gases flow along the external surface of the airfoils.

Figure 2:
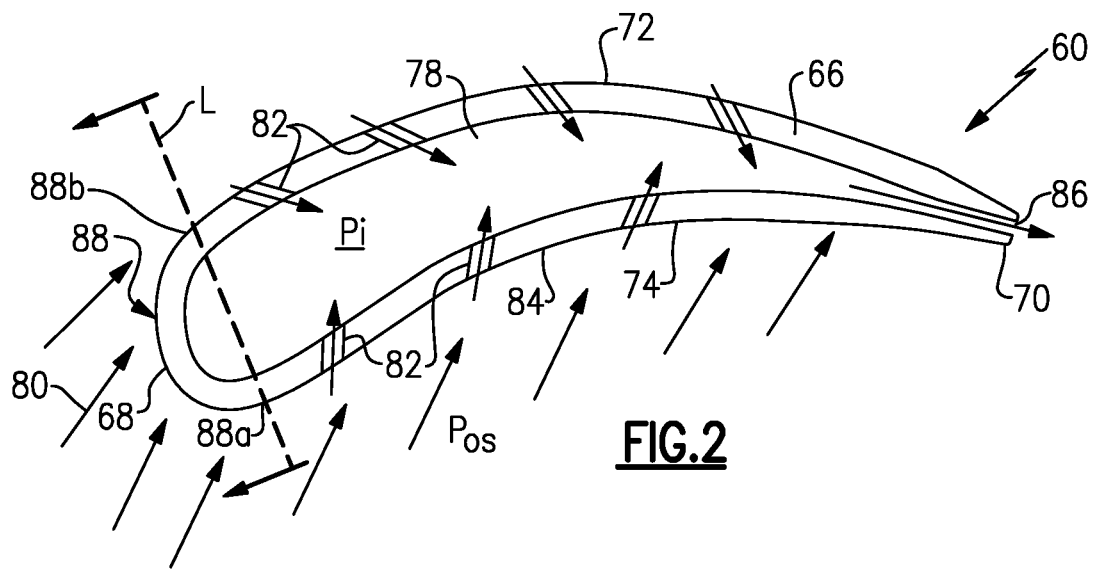
FIG. 2 is a schematic representation of a top of an airfoil incorporating the subject invention.
Figure 3:
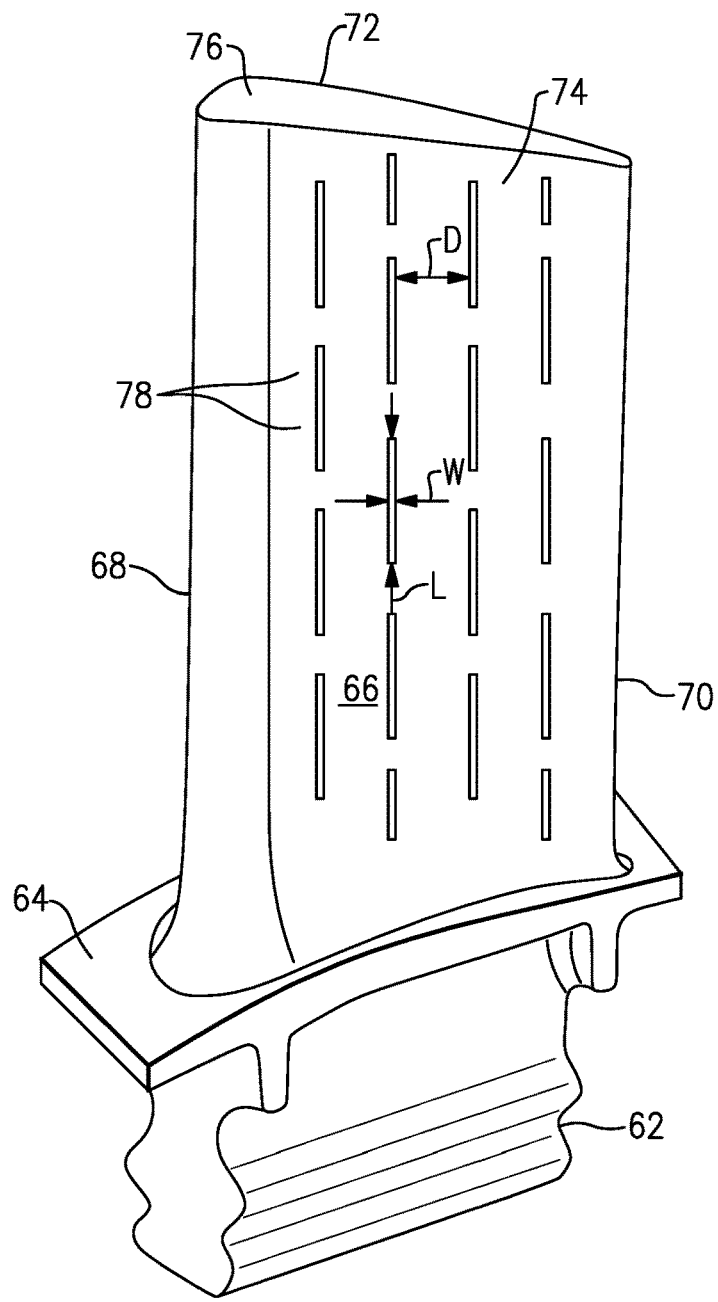
FIG. 3 is a side view of the airfoil of FIG. 2.

FIGS. 2-3 show an example of a turbine rotor blade 60 from the low pressure turbine 46 which has a root section 62, a platform 64, and an airfoil body 66. Root section 62 is connected to a rotor in the low pressure turbine 46 (FIG. 1) as known. The airfoil body 66 includes a leading edge 68, a trailing edge 70, a suction side wall 72, and a pressure side wall 74. The airfoil body 66 extends from a base at the platform 64 to a tip 76. The platform 64 connects the airfoil body 66 to the root section 62. The leading edge 68, trailing edge 70, suction side wall 72, and pressure side wall 74 extend outwardly away from the platform 64 in a direction opposite from the root section 62. Suction side wall 72 and pressure side wall 74 connect leading edge 68 and trailing edge 70.

As shown in FIG. 2, the airfoil body 66 includes an internal cavity 78. This cavity 78 is not a cooling cavity or cooling passage. This cavity 78 is typically formed in the airfoil bodies 66 of the low pressure turbine 46 as a weight savings measure. The airfoil body 66 is positioned within a hot gas flow path 80 and has at least one inlet opening 82 formed in an outer surface 84 of the airfoil body 66 to direct hot gas into the internal cavity 78. The airfoil body 66 also includes at least one outlet opening 86 formed in the outer surface 84 to expel the hot exhaust gas. The outlet opening 86 is located at a lower pressure area in the internal cavity 78 than the at least one inlet opening 82 such that hot gas is drawn into the internal cavity 78 via the at least one inlet opening 82 and expelled out the at least one outlet opening 86 to maintain laminar boundary layer attachment along the outer surface 84 as hot gas flows against the airfoil body 66.

As shown in FIG. 2, the internal cavity 78 has an internal pressure Pi and the hot gas flow path 80 has an external pressure $P_{os}$. A pressure differential is maintained such that there is a sufficiently low pressure level at the inlet to controllably ingest hot gas, in combination with a sufficiently high pressure level in the cavity 78 to expel the hot gas via the outlet opening 86. As such, Pi is less than P∞ at the inlet opening 82 and Pi is greater than P∞ at the outlet opening 86. In one example, a pressure ratio at the inlet of $P_{os}$/Pi is approximately 1.5-1.10, while the pressure ratio at the outlet of $P_{os}$/Pi is approximately 0.90-0.95.

By drawing the hot exhaust gases into an upstream end of the internal cavity 78 and expelling the gases via a downstream end of the cavity 78, a laminar boundary layer can be maintained along the pressure and/or suction sides of the airfoil body 66, which helps prevent stalled flow separation. Essentially, this is comparable to film cooling but in reverse. Instead of drawing cooling air into the internal cavity to cool the airfoil via film cooling hoes, hot exhaust gases are drawn into the internal cavity via inlet openings to help maintain laminar flow.

In the example shown in FIGS. 2-3, the at least one inlet opening 82 comprises a plurality of inlet openings 82 formed in one of or both of the pressure 74 and suction 72 side walls. The inlet openings 82 can be apertures, holes, slots, etc. and can have various shapes and/or sizes. Further, the leading edge 68 is free from inlet openings 82. In one example, a showerhead region 88 (identified by section line L in FIG. 2) of the airfoil body 66 does not include any inlet openings 82. The shower head region 88 encompasses the leading edge 68 and transition areas 88a, 88b that extend from the leading edge 68 along a short distance of the upstream portion of the pressure 74 and suction 72 side walls. The hot exhaust gas hits this showerhead region 88 which then directs the gas along the sides of the body 66 where a portion of the gas is then ingested via the inlet openings 82, with a remaining portion of the gas continuing to flow along the sides of the airfoil body 66. By not having inlet openings 82 in the showerhead region 88, it prevents a direct input of a large amount of hot exhaust gas and instead allows a more controlled metering ingestion of the gas which allows the laminar boundary layer to be maintained.

FIG. 3 shows one example of the inlet openings 82 comprising slots. In this example the slots extend in a generally axial direction along the length of the body 66. Each slot has a width W and a length L. In one example, the length L is longer than the width W. The lengths L and widths W can be the same for each slot or variable. In one example, the spacing between the slots is on the order of 10:1 to 20:1, as the ratio of a distance D along the surface between slots to the slot width W.

In one example, the at least one outlet opening 86 is located near or at the trailing edge 70 of the airfoil body 66. This location helps provide the desired transition from a lower pressure area of the internal cavity 78 at the inlet to a lower pressure area at the outlet. The internal cavity 78 is wider at the leading edge end of the airfoil body and subsequently narrows in a direction toward the trailing edge 70, which results in an increase in pressure needed to expel the hot exhaust gases. In another example, the at least one outlet opening 86 is located near or at the tip 76. This location utilizes centripetal pumping to assist in expelling the ingested hot exhaust flow.

As discussed above, the airfoil body 66 is not subjected to cooling airflow and does not include internal cooling passages. As such, the airfoil body 66 should be comprised of a material having a melting point temperature that is higher than a temperature of the hot gas flowing around the airfoil body 66. Optionally, it is possible to achieve higher operating temperature applicability for the component body by using coatings and thermal conductive enhancements.

Figure 4:
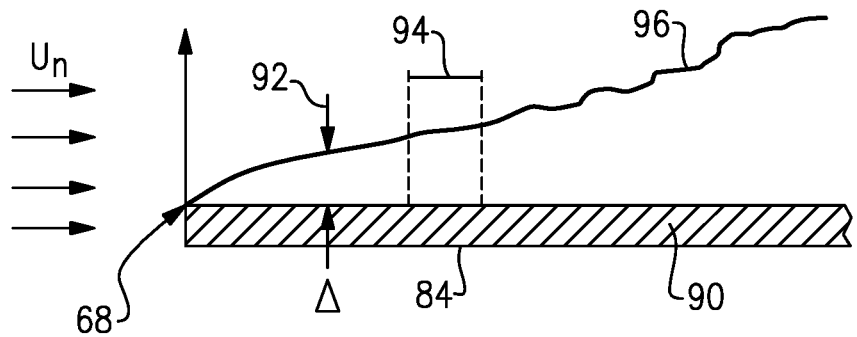
FIG. 4 is graph depicting an amount of turbulent flow generated as flow moves from a leading edge to trailing edge of an airfoil that does not include the subject invention.
Figure 5:
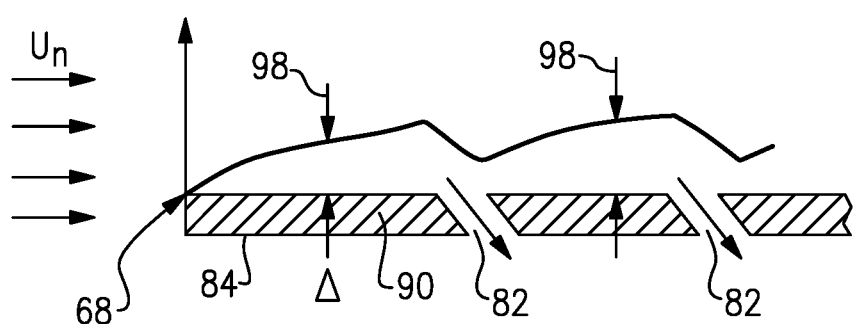
FIG. 5 is graph depicting an amount of turbulent flow generated as flow moves from a leading edge to trailing edge of an airfoil that does include the subject invention.

FIGS. 4 and 5 are a comparison between flow conditions for a traditional airfoil configuration (FIG. 4) and flow conditions for an airfoil body incorporating the subject invention (FIG. 5). Flow Un is directed toward the leading edge 68 of the airfoil body. Each graph has a y-axis that corresponds to an increasing outer distance Δ from the external surface 84 of the airfoil body and an x-axis that corresponds to an increasing distance starting from the leading edge 68 and going towards the trailing edge 70.

FIG. 4 is a flat plate nominal boundary layer diagram that shows a viscous sub-layer region 90 that is generally constant along the airfoil body from the leading edge 68 to the trailing edge 70. A laminar region of flow is indicated at 92 in a region that is just downstream from the leading edge 68. A transition region 94 shows the beginning of a departure from laminar flow. This transition region 94 ends approximately midway along the airfoil body 66 and then turns into a turbulent flow region 96 which becomes more turbulent in a direction of the trailing edge 70.

FIG. 5 is a flat plate enhanced laminar boundary layer diagram that shows a similar viscous sub-layer region 90 that is generally constant along the airfoil body from the leading edge 68 to the trailing edge 70; however, in this configuration there is no turbulent flow region. A laminar region of flow is indicated at 98 in a region that is just downstream from the leading edge 68, and as the flow starts to approach the transition region of FIG. 4, the flow reaches at least one inlet opening 82, which brings the flow back into a laminar boundary layer. This pattern continues down the length of the airfoil body such that the flow never moves out of the laminar flow region, i.e. turbulent flow is not experienced by the airfoil body of FIG. 5.

Figures 6, 7:
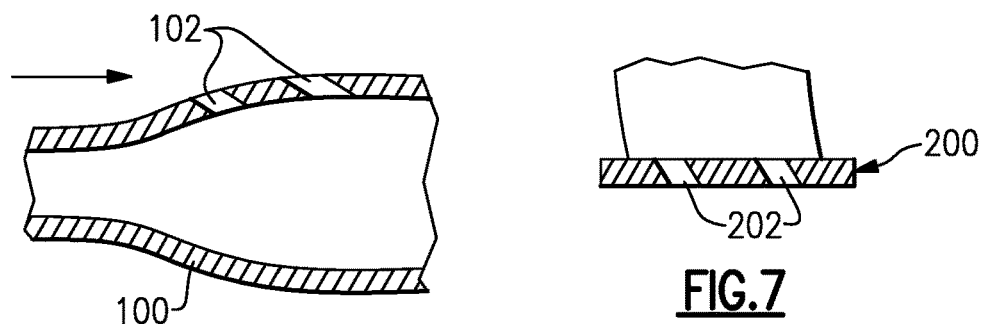
FIG. 6 is a schematic representation of a transition duct incorporating the subject invention.
FIG. 7 is a schematic representation of a platform incorporating the subject invention.

Further, it should be noted that while the subject invention is described as being used in an airfoil in a low pressure turbine, the invention could also be used in other areas such as transition ducts or platforms, for example. FIG. 6 shows an example of a transition duct 100 as used in a mid-turbine frame 57 or turbine exhaust case. The duct 100 includes inlet openings 102 that ingest gases in a manner that is similar to that described above. FIG. 7 shows an example of platform laminar flow where a platform 200 includes inlet openings 202 that ingest gases in a manner that is similar to that described above.

The subject invention utilizes hot gas inflow to maintain a laminar boundary layer along the pressure and/or suction sides of a component body 66, and to help prevent stalled flow separation. At least one internal cavity 78 of an otherwise uncooled blade, vane, or duct is maintained at an appropriate pressure level, low enough to selectively and controllably ingest hot gas from the external gas path but still high enough to expel the gas via an outlet from the component body 66. As discussed above, ingestion is through holes or thin radial slots with internal metering features. This ingestion helps to maintain laminar boundary layer attachment and prevents its decomposition into a turbulent boundary layer and viscous sub-layer.

This concept has been successfully demonstrated in flight tests for usage on aircraft wings to decrease both aerodynamic drag and frictional heating at high velocities. As a side effect, based on flat and conical plate studies, a laminar boundary layer created on an airfoil reduces the recovery factor towards a minimum of 0.81-0.83; otherwise the recovery factor approaching a more turbulent flow regime increases closer to 0.90. Some of the benefits of the subject invention in this configuration include the maintenance of laminar boundary layers in flow at extremely high Reynolds numbers (Re), to increase the turbine stage efficiency of an uncooled airfoil by as much as 1-2%. Further, with a recovery factor r=(Te−T)/(To/T) at typical LPT conditions (where Te=Taw=adiabatic wall temperature; T=Tm=mean stream temperature; and To=Ts=stagnation temperature), the lower recovery factor decreases the adiabatic wall temperature by a delta of as much as 14-15 degrees Fahrenheit. The nominally lower adiabatic wall temperature can be traded into other factors such as durability, thrust and/or efficiency. With thrust, increasing the LPT inlet temperature by 10-15 degrees Fahrenheit will equal a +1% core thrust. For single crystal superalloys, a 14 degree Fahrenheit increase in wall metal temperature yields approximately 40% better creep life (by the trade factor $2^{(-\Delta T/30° F.)}$). ΔT=delta metal temperature (degrees Fahrenheit).

In another example, this concept could be used to maintain boundary layer attachment for compressor airfoils or fan blades in a manner similar to turbine airfoils. In this application there would be aero efficiency and stall margin benefits. In one example, the compressor airfoil or fan blade is located within a flow path and would include at least one inlet to an internal cavity as described above. With a compressor blade, the ingested air could be bled out of the internal cavity through an outlet via an attachment to a secondary air system. The universal application for this concept to work is the availability of a relative suction pressure inside the airfoil versus the outside flow path.

Figure 8:
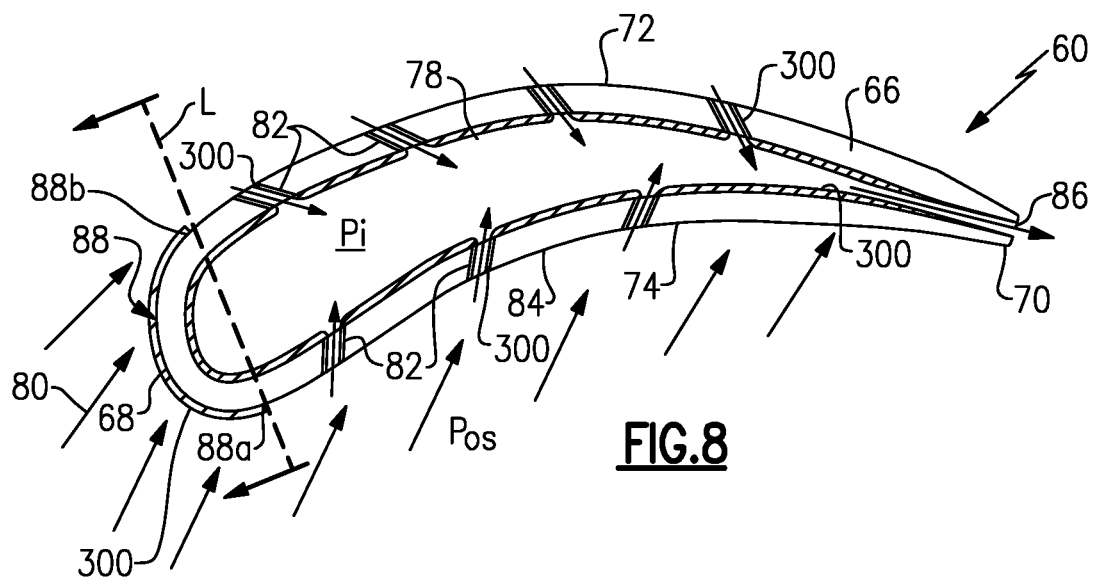
FIG. 8 is a schematic representation of a section of an airfoil incorporating another example of the subject invention.

In one example shown in FIG. 8, the airfoil body 66 is comprised of a non-metallic material. The transition duct 100 of FIG. 6 and the platform 200 of FIG. 7 could also be made from a non-metallic material. One example of a non-metallic material is a ceramic matrix composite (CMC) material that has a high temperature capability. Examples of CMC materials include, but are not limited to: alumina matrix material, silicon, silica or silicon carbide materials and any various combinations thereof. The matrix can include embedded ceramic fibers such as oxidation stable reinforcing fibers including monofilaments like silicon carbide for example, or can include yarn material comprising alumina silicates, silicon carbide (NICALON®, SYL-RAMIC®, etc. for example), and/or chopped whiskers of similar materials. The CMC material may also include ceramic particles such oxides of Al, Si, Y, Zr and/or inorganic fillers as needed. It should be understood that these are just some examples of CMC materials and that other types of CMC materials could also be used. Optionally, monolithic ceramic or other similar high heat and highs strength materials could also be used.

In the example shown in FIG. 8, one or more of the inlet openings 82 have passage surfaces that are coated with a coating 300 comprising at least one of a thermal barrier coating (TBC) or environmental barrier coating (EBC). The inlet openings 102 in the duct 100 and the inlet openings 202 in the platform 200 may also include passage surfaces that are coated with the coating 300 comprising at least one of a thermal barrier coating or environmental barrier coating. As discussed above, high temperature exhaust flow is directed through the inlet openings 82 and into the internal cavity 78. In one example, the surfaces of the cavity 78 and openings 82 can be exposed to temperatures as high as 2000 degrees Celsius which can induce high thermal stress into the component. Further, the exhaust vapor exiting the combustor can degrade surfaces, such as a CMC material, for example. The TBC and/or EBC helps protect these surfaces from experiencing high thermal stress and from degrading under the high temperatures.

In one example, the EBC comprises a low conductivity coating that can be comprised of one or more coating layers. The EBC, for example, can have a thermal conductivity that is up to 10 times less than a thermal conductivity of the non-metallic material of the component body 66 to reduce the formation of thermal stresses in the body 66. In one example, the EBC coating comprises a first layer that includes silicon or silica and at least one or more secondary layers that include any of the following in any combination thereof: a rare earth silicate layer, a yttrium monosilicate, a mullite layer and/or a mullite and alkaline earth aluminosilicate layer, a barium strontium aluminosilicate layer, an ytterbium based layer, or layers of other similar materials.

Figure 10:
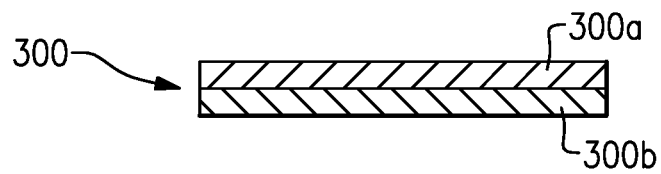
FIG. 10 is a schematic representation of using multiple coating layers for any of the previously shown configurations.

As shown in the example of FIG. 8, the coating 300 is applied on at least a portion of a laminar flow control aperture, e.g. an inlet opening 82, of the body 66. As discussed above, the coating 300 may be a TBC 300a, an EBC 300b, or a combination of both as shown in FIG. 10. The coating 300 can be applied via chemical vapor deposition (CVD) or chemical vapor infiltration (CVI), or any other coating process.

Figure 9:
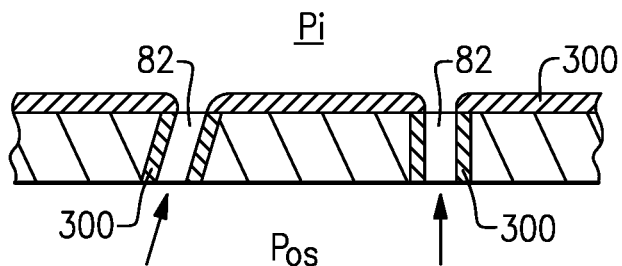
FIG. 9 is a schematic representation of a gas turbine engine component including a coating layer.

In one example, all passage surfaces of the inlet openings 82 include the coating 300. In one example, surfaces of all, or at least a portion of, the internal cavity 78 also include the coating 300, see FIG. 9 for example. Additionally, as discussed above, the coatings 300 in this area can be comprised of multiple layers of EBC and TBC in any order. In one example, the outermost layer of the coating 300 is comprised of a TBC. The coating 300 is especially useful when used in combination with a component body made from a CMC material. The coating 300 protects the exposed surfaces from any degrading effects of the combustor vapor gases as the hot exhaust flow is directed through the inlet openings and drawn into the component internal cavity in a controlled manner such that the hot exhaust gas across the outer surface maintains a laminar boundary layer. This coating 300 is also especially useful for LPT components that do not receive a cooling airflow but instead control ingestion of hot flow to maintain the laminar boundary layer to improve operating efficiency.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
a component body configured to be positioned within a flow path of a gas turbine engine having an external pressure, wherein the component body comprises an airfoil, and wherein the component body includes a leading edge, a trailing edge, and pressure and suction side walls extending from the leading edge to the trailing edge, and wherein the component body extends from a base to a tip to define a length and has a width extending from the leading edge to the trailing edge;
at least one internal cavity in the component body having an internal pressure, and wherein the component body is positioned downstream of a combustor section and comprises a non-cooled component where the at least one internal cavity is free from receiving cooling flow;
a plurality of inlet openings formed in an outer surface of the component body to direct hot exhaust gas flow into the at least one internal cavity, wherein the leading edge is free from the plurality of inlet openings, and wherein the plurality of inlet openings comprise radial slots that are spaced apart from each other along the width of the component body from the leading edge to the trailing edge and are spaced apart from each other along the length of the component body from the base to the tip; and
at least one outlet from the at least one internal cavity formed at the trailing edge, wherein the internal pressure is less than an inlet external pressure at the plurality of inlet openings and the internal pressure is greater than an outlet external pressure at the at least one outlet to controllably ingest hot exhaust gas via the plurality of inlet openings and expel the hot exhaust gas via the at least one outlet to maintain a laminar boundary layer along the outer surface of the component body.

2. The gas turbine engine component according to claim 1 wherein the plurality of inlet openings are formed in both of the pressure and suction side walls.

3. The gas turbine engine component according to claim 1 wherein the at least one outlet comprises at least one opening to the outer surface that is located near or at the tip.

4. The gas turbine engine component according to claim 1 wherein the plurality of inlet openings provide a passage surface that is coated with at least one of a thermal barrier coating or environmental barrier coating.

5. The gas turbine engine component according to claim 4 wherein the at least one internal cavity is coated with at least one of a thermal barrier coating or environmental barrier coating.

6. The gas turbine engine component according to claim 5 wherein the at least one internal cavity and the plurality of inlet openings are coated with a plurality of coatings including at least one thermal barrier coating and at least one environmental barrier coating.

7. The gas turbine engine component according to claim 4 wherein the component body is comprised of a non-metallic material.

8. The gas turbine engine component according to claim 7 wherein the non-metallic material is a ceramic matrix composite material.

9. A gas turbine engine comprising:
a component body configured to be positioned within a flow path of a gas turbine engine having an external pressure, wherein the component body includes at least one internal cavity having an internal pressure, wherein the component body comprises an airfoil, and wherein the component body includes a leading edge, a trailing edge, and pressure and suction side walls extending from the leading edge to the trailing edge, and wherein the component body extends from a base to a tip to define a length and has a width extending from the leading edge to the trailing edge;

a plurality of inlet openings formed in an external surface of the component body to direct hot exhaust gas flow into the at least one internal cavity, wherein the plurality of inlet openings include a passage surface that is coated with at least one of a thermal barrier coating or environmental barrier coating, and wherein the plurality of inlet openings comprise radial slots that are spaced apart from each other along the width of the component body from the leading edge to the trailing edge and are spaced apart from each other along the length of the component body from the base to the tip; and at least one outlet from the at least one internal cavity, wherein the internal pressure is less than an inlet external pressure at the plurality of inlet openings and the internal pressure is greater than an outlet external pressure at the at least one outlet to controllably ingest hot exhaust gas via the plurality of inlet openings and expel the hot exhaust gas via the at least one outlet to maintain a laminar boundary layer along the external surface of the component body.

10. The gas turbine engine according to claim 9 wherein the at least one internal cavity is free from receiving cooling air flow, and wherein the plurality of inlet openings are formed within the pressure and suction side walls, and wherein the leading edge comprises a showerhead region that encompasses the leading edge and transition areas that extend from the leading edge along an upstream portion of the pressure and suction side walls, and wherein the showerhead region is free from holes or slots, and wherein the plurality of inlet openings are spaced apart from each other along the pressure and suction side walls from downstream of the showerhead region to the trailing edge.

11. The gas turbine engine according to claim 10 including:
a compressor section;
a combustor section downstream of the compressor section; and
a turbine section downstream of the combustor section, and wherein the turbine section includes at least a high pressure turbine downstream of the combustor section and a low pressure turbine downstream of the high pressure turbine, and wherein the airfoil is located within the low pressure turbine.

12. The gas turbine engine according to claim 9 wherein the at least one internal cavity is coated with at least one of a thermal barrier coating or environmental barrier coating.

13. The gas turbine engine according to claim 9 wherein the at least one internal cavity and the plurality of inlet openings are coated with a plurality of coatings including at least one layer of a thermal barrier coating and at least one layer of an environmental barrier coating.

14. The gas turbine engine component according to claim 13 wherein the component body is made of a non-metallic material comprising a ceramic matrix composite material.

15. A method of enhancing laminar flow for a gas turbine engine component comprising the steps of:

a) positioning a component body comprising an airfoil within a hot gas flow of a gas turbine engine having an external pressure, wherein the component body includes a leading edge, a trailing edge, and pressure and suction side walls extending from the leading edge to the trailing edge, and wherein the component body extends from a base to a tip to define a length and has a width extending from the leading edge to the trailing edge, and wherein the component body has at least one internal cavity having an internal pressure, and wherein the component body is positioned downstream of a combustor section;

b) keeping the at least one internal cavity free from cooling flow;

c) providing a plurality of inlet openings formed in an external surface of the component body to direct hot exhaust gas flow into the at least one internal cavity, wherein the plurality of inlet openings comprise radial slots that are spaced apart from each other along the width of the component body from the leading edge to the trailing edge and are spaced apart from each other along the length of the component body from the base to the tip, and wherein the leading edge is free from the plurality of inlet openings, and providing at least one outlet from the at least one internal cavity to external atmosphere, wherein the at least one outlet is at the trailing edge, and d) maintaining the internal pressure to be less than the external pressure at the plurality of inlet openings and to be greater than the external pressure at the at least one outlet to controllably ingest a portion of the hot gas flow via the plurality of inlet openings and expel ingested hot exhaust gas via the at least one outlet to maintain a laminar boundary layer of a remaining portion of the hot gas flow along the external surface of the component body.

16. The method according to claim 15 including
forming the component body from a non-metallic material, and
coating at least one of the internal cavity and the plurality of inlet openings with at least one of a thermal barrier coating or environmental barrier coating.

17. The method according to claim 15 wherein the plurality of inlet openings are formed within the pressure and suction side walls, and wherein the airfoil includes a showerhead region that encompasses the leading edge and transition areas that extend from the leading edge along an upstream portion of the pressure and suction side walls, and wherein the showerhead region is free from the plurality of inlet openings, and wherein the plurality of inlet openings are spaced apart from each other along the pressure and suction side walls from downstream of the showerhead region to the trailing edge.

18. The method according to claim 15 wherein spacing between adjacent radial slots is 10:1 to 20:1 as a ratio of a distance between adjacent radial slots along the external surface in a direction of an engine center longitudinal axis to a width of the radial slots.

19. The gas turbine engine according to claim 9 wherein spacing between adjacent radial slots is 10:1 to 20:1 as a ratio of a distance between adjacent radial slots along the external surface in a direction of an engine center longitudinal axis to a width of the radial slots.

20. The gas turbine engine component according to claim 1 wherein the component body includes a showerhead region that encompasses the leading edge and transition areas that extend from the leading edge along an upstream portion of pressure and suction side walls, and wherein the showerhead region is free from the plurality of inlet openings, and wherein the radial slots each have a slot height that is greater than a slot width, and wherein the radial slots are spaced apart from each other along the width of the pressure and suction side walls from downstream of the showerhead region to the trailing edge, and are spaced apart from each other along the length from the base to the tip.

21. The gas turbine engine component according to claim 1 wherein spacing between adjacent radial slots is 10:1 to 20:1 as a ratio of a distance between adjacent radial slots along the outer surface in a direction of an engine center longitudinal axis to a width of the radial slots.

* * * * *